US012711901B2

(12) United States Patent
Cong et al.

(10) Patent No.: US 12,711,901 B2
(45) Date of Patent: Aug. 18, 2026

(54) PIXEL CIRCUITRY, DRIVING METHOD, DISPLAY SUBSTRATE, AND DISPLAY DEVICE

(71) Applicants: BEIJING BOE DISPLAY TECHNOLOGY CO., LTD., Beijing (CN); BOE TECHNOLOGY GROUP CO., LTD., Beijing (CN); Beijing BOE Technology Development Co., Ltd., Beijing (CN)

(72) Inventors: Ning Cong, Beijing (CN); Minghua Xuan, Beijing (CN); Can Zhang, Beijing (CN); Can Wang, Beijing (CN); Jinfei Niu, Beijing (CN); Jiakui Yan, Beijing (CN)

(73) Assignees: BEIJING BOE DISPLAY TECHNOLOGY CO., LTD., Beijing (CN); BOE TECHNOLOGY GROUP CO., LTD., Beijing (CN); Beijing BOE Technology Development Co., Ltd., Beijing (CN)

( * ) Notice: Subject to any disclaimer, the term of this patent is extended or adjusted under 35 U.S.C. 154(b) by 151 days.

(21) Appl. No.: 18/851,985

(22) PCT Filed: Sep. 22, 2023

(86) PCT No.: PCT/CN2023/120753
§ 371 (c)(1),
(2) Date: Sep. 27, 2024

(87) PCT Pub. No.: WO2025/060073
PCT Pub. Date: Mar. 27, 2025

(65) Prior Publication Data
US 2026/0188180 A1 Jul. 2, 2026

(51) Int. Cl.
*G09G 3/32* (2016.01)

(52) U.S. Cl.
CPC ......... *G09G 3/32* (2013.01); *G09G 2300/043* (2013.01); *G09G 2300/0465* (2013.01);
(Continued)

(58) Field of Classification Search
None
See application file for complete search history.

(56) References Cited

U.S. PATENT DOCUMENTS

| | | | | |
|---|---|---|---|---|
| 2014/0327664 A1* | 11/2014 | Kanda | G09G 3/3233 345/212 |
| 2020/0152118 A1* | 5/2020 | Xu | G09G 3/325 |
| 2021/0225262 A1 | 7/2021 | Liu | |

FOREIGN PATENT DOCUMENTS

| | | |
|---|---|---|
| CN | 104134680 A | 11/2014 |
| CN | 104575379 A | 4/2015 |

(Continued)

OTHER PUBLICATIONS

Office Action dated Oct. 23, 2025, issued in counterpart CN Application No. 202380010820.6, with English translation. (14 pages).

*Primary Examiner* — Christopher J Kohlman
(74) *Attorney, Agent, or Firm* — WHDA, LLP

(57) ABSTRACT

The present disclosure provides a pixel circuitry, a driving method, a display substrate, and a display device. The pixel circuitry includes a data write-in circuitry, an energy storage circuitry, a first control circuitry, a second control circuitry, a driving circuitry, and a light-emitting element. The data write-in circuitry writes a data voltage into a first node under the control of a write-in control signal; the first control circuitry controls the first node to be electrically coupled to, or electrically decoupled from, a second node under the control of a light-emission control signal; the second control circuitry controls a first voltage end to be electrically coupled to, or electrically decoupled from, the second node (Continued)

under the control of the light-emission control signal; and the driving circuitry generates a driving current under control of a potential at the second node.

20 Claims, 3 Drawing Sheets

(52) U.S. Cl.
CPC .............. *G09G 2300/0842* (2013.01); *G09G 2320/0233* (2013.01)

(56) References Cited

FOREIGN PATENT DOCUMENTS

| | | | |
|---|---|---|---|
| CN | 107424569 | A | 12/2017 |
| CN | 109285503 | A | 1/2019 |
| CN | 210378422 | U | 4/2020 |
| CN | 114255691 | A | 3/2022 |
| CN | 114641817 | A | 6/2022 |
| CN | 116206567 | A | 6/2023 |
| CN | 116229864 | A | 6/2023 |
| CN | 116312340 | A | 6/2023 |

* cited by examiner

PIXEL CIRCUITRY, DRIVING METHOD, DISPLAY SUBSTRATE, AND DISPLAY DEVICE

CROSS-REFERENCE TO RELATED APPLICATION

The present disclosure is the U.S. national phase of PCT Application No. PCT/CN2023/120753 filed on Sep. 22, 2023, which is incorporated herein by reference in its entirety.

TECHNICAL FIELD

The present disclosure relates to the field of display technology, in particular to a pixel circuitry, a driving method, a display substrate and a display device.

BACKGROUND

Micro Light-Emitting Diode (Micro LED) has a great application prospect in the display field due to such advantages as high brightness, long service time, and small volume. Currently, for a glass-based Micro LED, it is unable to realize high pixel per inch (PPI) display due to the limitation of a size and stability of a thin film transistor (TFT), while for a silicon-based Micro LED, it is able to greatly reduce an area of a pixel circuitry, thereby to significantly increase the PPI.

Tests show that, there are the following main problems for the Micro LED: a main peak drifts along with a change in a current density, and luminance uniformity is not good at a low current density.

SUMMARY

In one aspect, the present disclosure provides in some embodiments a pixel circuitry, including a data write-in circuitry, an energy storage circuitry, a first control circuitry, a second control circuitry, a driving circuitry, and a light-emitting element. The data write-in circuitry is electrically coupled to a write-in control end, a data line and a first node, and configured to write a data voltage from the data line into the first node under the control of a write-in control signal from the write-in control end. The energy storage circuitry is electrically coupled to the first node, and configured to maintain a potential at the first node. The first control circuitry is electrically coupled to a light-emission control end, the first node and a second node, and configured to control the first node to be electrically coupled to, or electrically decoupled from, the second node under the control of a light-emission control signal from the light-emission control end. The second control circuitry is electrically coupled to the light-emission control end, a first voltage end and the second node, and configured to control the first voltage end to be electrically coupled to, or electrically decoupled from, the second node under the control of the light-emission control signal. The driving circuitry is electrically coupled to the second node, a second voltage end, and a first electrode of the light-emitting element, and configured to generate a driving current flowing from the second voltage end to the first electrode of the light-emitting element under the control of a potential at the second node. A second electrode of the light-emitting element is electrically coupled to a third voltage end.

In a possible embodiment of the present disclosure, the data write-in circuitry includes a first transistor and a second transistor, and the write-in control end includes a first write-in control end and a second write-in control end; a gate electrode of the first transistor is electrically coupled to the first write-in control end, a first electrode of the first transistor is electrically coupled to the data line, and a second electrode of the first transistor is electrically coupled to the first node; and a gate electrode of the second transistor is electrically coupled to the second write-in control end, a first electrode of the second transistor is electrically coupled to the data line, and a second electrode of the second transistor is electrically coupled to the first node.

In a possible embodiment of the present disclosure, the first transistor is a p-type transistor, and the second transistor is an n-type transistor; or the first transistor is an n-type transistor, and the second transistor is a p-type transistor.

In a possible embodiment of the present disclosure, the first control circuitry includes a third transistor, and the second control circuitry includes a fourth transistor; a gate electrode of the third transistor is electrically coupled to the light-emission control end, a first electrode of the third transistor is electrically coupled to the first node, and a second electrode of the third transistor is electrically coupled to the second node; and a gate electrode of the fourth transistor is electrically coupled to the light-emission control end, a first electrode of the fourth transistor is electrically coupled to the first voltage end, and a second electrode of the fourth transistor is electrically coupled to the second node.

In a possible embodiment of the present disclosure, the third transistor is a p-type transistor, and the fourth transistor is an n-type transistor; or the third transistor is an n-type transistor, and the fourth transistor is a p-type transistor.

In a possible embodiment of the present disclosure, the energy storage circuitry includes a storage capacitor, a first end of the storage capacitor is electrically coupled to the first node, and a second end of the storage capacitor is electrically coupled to a direct current voltage end.

In a possible embodiment of the present disclosure, the driving circuitry includes a driving transistor, a gate electrode of the driving transistor is electrically coupled to the second node, a first electrode of the driving transistor is electrically coupled to the second voltage end, and a second electrode of the driving transistor is electrically coupled to the first electrode of the light-emitting element.

In a possible embodiment of the present disclosure, the driving transistor is a p-type transistor, and the first voltage end is a first high voltage end; or the driving transistor is an n-type transistor, and the first voltage end is a first low voltage end.

In a possible embodiment of the present disclosure, the light-emitting element is a silicon-based Micro LED, and the pixel circuitry is arranged on a silicon substrate.

In another aspect, the present disclosure provides in some embodiments a driving method for the above-mentioned pixel circuitry, a display cycle including N display time periods, an $n^{th}$ display time period including an $n^{th}$ write-in stage and an $n^{th}$ light-emitting stage arranged one after another, N being an integer greater than 1, and n being a positive integer less than or equal to N. The driving method includes: at the $n^{th}$ write-in stage, writing, by a data write-in circuitry, an $n^{th}$ data voltage from a data line into a first node under the control of a write-in control signal, maintaining, by an energy storage circuitry, a potential at the first node, and controlling, by a second control circuitry, a first voltage end to be electrically coupled to a second node under the control of a light-emission control signal, so as to enable a driving circuitry to be turned off under the control of a potential at the second node; and at the $n^{th}$ light-emitting stage, controlling, by a first control circuitry, the first node to be electrically coupled to the second node under the control of the light-emission control signal to write the $n^{th}$ data voltage into the second node, and controlling, by the driving circuitry, whether to drive a light-emitting element to emit light in accordance with the $n^{th}$ data voltage.

In a possible embodiment of the present disclosure, durations of N light-emitting stages are different from each other.

In a possible embodiment of the present disclosure, durations of at least a part of the N light-emitting stages are different from each other.

In a possible embodiment of the present disclosure, a duration of the $n^{th}$ light-emitting stage is 2n*t0 or 2n*t0, where t0 is a reference light-emitting time.

In yet another aspect, the present disclosure provides in some embodiments a display substrate, including a silicon substrate, and the above-mentioned pixel circuitry arranged on the silicon substrate.

In still yet another aspect, the present disclosure provides in some embodiments a display device, including the above-mentioned display substrate.

DETAILED DESCRIPTION

Figure 1:
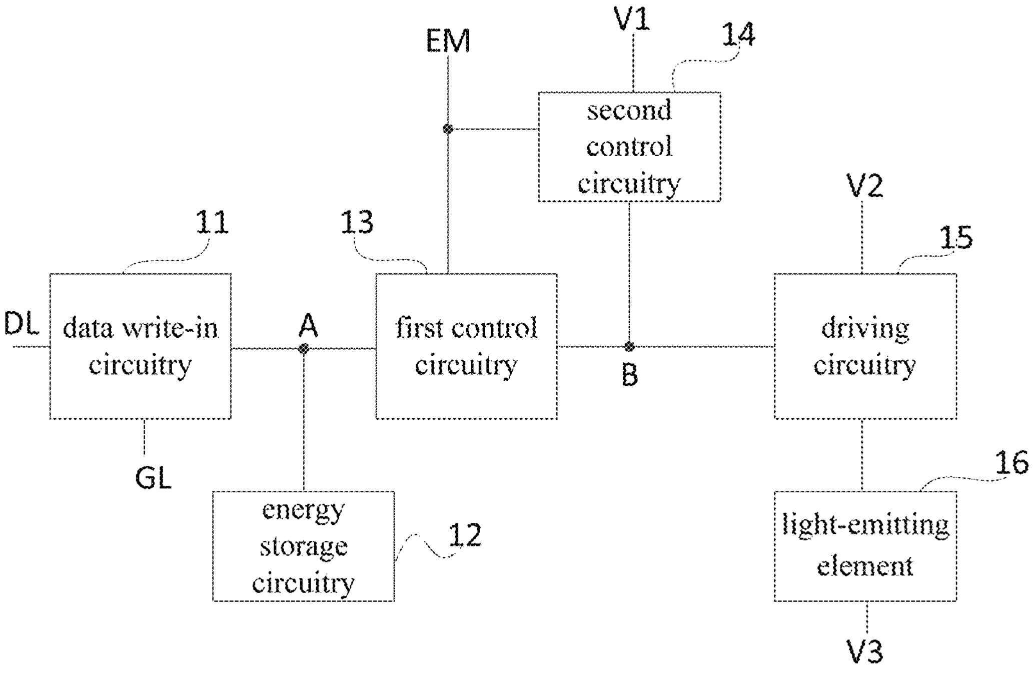
FIG. 1 is a schematic view of a pixel circuitry according to one embodiment of the present disclosure.

In order to make the objects, the technical solutions and the advantages of the present disclosure more apparent, the present disclosure will be described hereinafter in a clear and complete manner in conjunction with the drawings and embodiments. Obviously, the following embodiments merely relate to a part of, rather than all of, the embodiments of the present disclosure, and based on these embodiments, a person skilled in the art may, without any creative effort, obtain the other embodiments, which also fall within the scope of the present disclosure.

All transistors adopted in the embodiments of the present disclosure may be triodes, thin film transistors (TFT), field effect transistors (FETs) or any other elements having an identical characteristic. In order to differentiate two electrodes other than a gate electrode from each other, one of the two electrodes is called as first electrode and the other is called as second electrode.

In actual use, when the transistor is a TFT or FET, the first electrode may be a drain electrode and the second electrode may be a source electrode, or the first electrode may be a source electrode and the second electrode may be a drain electrode.

The present disclosure provides in some embodiments a pixel circuitry, which includes a data write-in circuitry, an energy storage circuitry, a first control circuitry, a second control circuitry, a driving circuitry, and a light-emitting element. The data write-in circuitry is electrically coupled to a write-in control end, a data line and a first node, and configured to write a data voltage from the data line into the first node under the control of a write-in control signal from the write-in control end. The energy storage circuitry is electrically coupled to the first node, and configured to maintain a potential at the first node. The first control circuitry is electrically coupled to a light-emission control end, the first node and a second node, and configured to control the first node to be electrically coupled to, or electrically decoupled from, the second node under the control of a light-emission control signal from the light-emission control end. The second control circuitry is electrically coupled to the light-emission control end, a first voltage end and the second node, and configured to control the first voltage end to be electrically coupled to, or electrically decoupled from, the second node under the control of the light-emission control signal. The driving circuitry is electrically coupled to the second node, a second voltage end, and a first electrode of the light-emitting element, and configured to generate a driving current flowing from the second voltage end to the first electrode of the light-emitting element under the control of a potential at the second node. A second electrode of the light-emitting element is electrically coupled to a third voltage end.

During the operation of the pixel circuitry, a display cycle includes N display time periods, and an $n^{th}$ display time period includes an $n^{th}$ write-in stage and an $n^{th}$ light-emitting stage arranged one after another. A duration of the $n^{th}$ light-emitting stage is tn, and durations of the light-emitting stages are different from each other, or durations of at least a part of N light-emitting stages are different from each other.

At the $n^{th}$ write-in stage, the data write-in circuitry writes an $n^{th}$ data voltage from the data line into the first node under the control of the write-in control signal, the energy storage circuitry maintains a potential at the first node, and the second control circuitry controls the first voltage end to be electrically coupled to the second node under the control of the light-emission control signal, so as to control the driving circuitry to be turned off.

At the $n^{th}$ light-emitting stage, the first control circuitry controls the first node to be electrically coupled to the second node under the control of the light-emission control signal to write the $n^{th}$ data voltage into the second node, and the driving circuitry controls whether to drive the light-emitting element to emit light in accordance with the $n^{th}$ data voltage.

During the operation of the pixel circuitry, whether or not the driving circuitry drives the light-emitting element to emit light is controlled at each light-emitting stage through controlling the $n^{th}$ data voltage, and brightness is controlled through adjusting a display time period, so as to perform pulse width modulation (PWM) control, thereby to improve the display uniformity.

During the implementation, the duration tn of the $n^{th}$ light-emitting stage is 2n×t0 or $2^n$×t0. However, the value of tn is not limited thereto, and in may also have any other value. In addition, t0 is a reference light-emitting time.

In a possible embodiment of the present disclosure, the first voltage end is a first high voltage end, the second voltage end is a second high voltage end, and the third voltage end is a low voltage end; or the first voltage end is a second low voltage end, the second voltage end is a second high voltage end, and the third voltage end is a first low voltage end.

In at least one embodiment of the present disclosure, the light-emitting element is, but not limited to, a silicon-based Micro LED, and the pixel circuitry is arranged on, but not limited to, a silicon substrate.

According to the pixel circuitry in the embodiments of the present disclosure, it is able to achieve the PWM control, thereby to effectively improve the brightness uniformity.

In at least one embodiment of the present disclosure, the pixel circuitry is arranged on the silicon substrate, and characteristics of silicon-based transistors are much better than those of glass-based transistors, so it is unnecessary to perform threshold voltage compensation, thereby to further increase the PPI.

As shown in FIG. 1, the pixel circuitry includes a data write-in circuitry 11, an energy storage circuitry 12, a first control circuitry 13, a second control circuitry 14, a driving circuitry 15, and a light-emitting element 16.

The data write-in circuitry 11 is electrically coupled to a write-in control end GL, a data line DL and a first node A, and configured to write a data voltage from the data line DL into the first node A under the control of a write-in control signal from the write-in control end GL.

The energy storage circuitry 12 is electrically coupled to the first node A, and configured to maintain a potential at the first node A.

The first control circuitry 13 is electrically coupled to a light-emission control end EM, the first node A and a second node B, and configured to control the first node A to be electrically coupled to, or electrically decoupled from, the second node B under the control of a light-emission control signal from the light-emission control end EM.

The second control circuitry 14 is electrically coupled to the light-emission control end EM, a first voltage end V1 and the second node B, and configured to control the first voltage end V1 to be electrically coupled to, or electrically decoupled from, the second node B under the control of the light-emission control signal.

The driving circuitry 15 is electrically coupled to the second node B, a second voltage end V2 and a first electrode of the light-emitting element 16, and configured to generate a driving current flowing from the second voltage end V2 to the first electrode of the light-emitting element 16 under the control of a potential at the second node B.

A second electrode of the light-emitting element 16 is electrically coupled to a third voltage end V3.

During the operation of the pixel circuitry in FIG. 1, a display cycle includes N display time periods, an $n^{th}$ display time period includes an $n^{th}$ write-in stage and an $n^{th}$ light-emitting stage arranged one after another, and a duration of the $n^{th}$ light-emitting stage is tn, where N is an integer greater than 1, and n is a positive integer less than or equal to N.

At the n-th write-in stage, the data write-in circuitry 11 writes an $n^{th}$ data voltage Vdn from the data line DL into the first node A under the control of the write-in control signal, the energy storage circuitry 12 maintains a potential at the first node A, and the second control circuitry 14 controls the first voltage end V1 to be electrically coupled to the second node B under the control of the light-emission control signal, so that a first end and a second end of the driving circuitry 15 are electrically decoupled from each other under the control of a potential at the second node B.

At the n-th light-emitting stage, the first control circuitry 13 controls the first node A to be electrically coupled to the second node B under the control of the light-emission control signal to write the $n^{th}$ data voltage Vdn into the second node B, and the driving circuitry 15 controls whether to drive the light-emitting element 16 to emit light in accordance with the $n^{th}$ data voltage Vdu.

During the operation of the pixel circuitry in FIG. 1, at the $n^{th}$ write-in stage, the first control circuitry 13 controls the first node A to be electrically decoupled from the second node B under the control of the light-emission control signal. At the $n^{th}$ light-emitting stage, the data write-in circuitry 11 controls the data line DL to be electrically decoupled from the first node A under the control of the write-in control signal, and the second control circuitry 13 controls the first voltage end V1 to be electrically decoupled from the second node B under the control of the light-emission control signal.

In the pixel circuitry in FIG. 1, the duration of the $n^{th}$ light-emitting stage is tn.

In the pixel circuitry in FIG. 1, when N is equal to 3, the display cycle includes three display time periods. A duration of a first light-emitting stage is t1, a duration of a second light-emitting stage is t2, and a duration of a third light-emitting stage is t3.

When the brightness of the light-emitting element corresponds to a binary number 000 and the light-emitting element does not emit light at the first light-emitting stage, the second light-emitting stage and the third light-emitting stage, a total light-emitting duration of the light-emitting element is 0 in the display cycle.

When the brightness of the light-emitting element corresponds to a binary number 001 and the light-emitting element emits light at the first light-emitting stage but does not emit light at the second light-emitting stage and the third light-emitting stage, the total light-emitting duration of the light-emitting element is t1 in the display cycle.

When the brightness of the light-emitting element corresponds to a binary number 010 and the light-emitting element emits light at the second light-emitting stage but does not emit light at the first light-emitting stage and the third light-emitting stage, the total light-emitting duration of the light-emitting element is t2 in the display cycle.

When the brightness of the light-emitting element corresponds to a binary number 011 and the light-emitting element emits light at the first light-emitting stage and the second light-emitting stage but does not emit light at the third light-emitting stage, the total light-emitting duration of the light-emitting element is t1+t2 in the display cycle.

When the brightness of the light-emitting element corresponds to a binary number 100 and the light-emitting element does not emit light at the first light-emitting stage and the second light-emitting stage but emits light at the third light-emitting stage, the total light-emitting duration of the light-emitting element is t3 in the display cycle.

When the brightness of the light-emitting element corresponds to a binary number 101 and the light-emitting element emits light at the first light-emitting stage and the third light-emitting stage but does not emit light at the second light-emitting stage, the total light-emitting duration of the light-emitting element is t1+t3 in the display cycle.

When the brightness of the light-emitting element corresponds to a binary number 110 and the light-emitting element emits light at the first light-emitting stage and the third light-emitting stage but does not emit light at the second light-emitting stage, the total light-emitting duration of the light-emitting element is t2+t3 in the display cycle.

When the brightness of the light-emitting element corresponds to a binary number 111 and the light-emitting element emits light at the first light-emitting stage, the second light-emitting stage and the third light-emitting stage, the total light-emitting duration of the light-emitting element is t1+t2+t3 in the display cycle.

During the implementation, t1 is 2t0, t2 is 4t0, and t3 is 6t0; or t1 is 2t0, t2 is 4t0, and t3 is 8t0. However, the present disclosure is not limited thereto.

In at least one embodiment of the present disclosure, the data write-in circuitry includes a first transistor and a second transistor, and the write-in control end includes a first write-in control end and a second write-in control end; a gate electrode of the first transistor is electrically coupled to the first write-in control end, a first electrode of the first transistor is electrically coupled to the data line, and a second electrode of the first transistor is electrically coupled to the first node; and a gate electrode of the second transistor is electrically coupled to the second write-in control end, a first electrode of the second transistor is electrically coupled to the data line, and a second electrode of the second transistor is electrically coupled to the first node.

During the implementation, the write-in control end includes the first write-in control end and the second write-in control end, and the data write-in circuitry includes the first transistor and the second transistor. A type of the first transistor is different from that of the second transistor, and a first write-in control signal from the first write-in control end has a phase reverse to a second write-in control signal from the second write-in control end.

In a possible embodiment of the present disclosure, the first transistor is a p-type transistor, and the second transistor is an n-type transistor; or the first transistor is an n-type transistor, and the second transistor is a p-type transistor.

In at least one embodiment of the present disclosure, the first control circuitry includes a third transistor, and the second control circuitry includes a fourth transistor; a gate electrode of the third transistor is electrically coupled to the light-emission control end, a first electrode of the third transistor is electrically coupled to the first node, and a second electrode of the third transistor is electrically coupled to the second node; and a gate electrode of the fourth transistor is electrically coupled to the light-emission control end, a first electrode of the fourth transistor is electrically coupled to the first voltage end, and a second electrode of the fourth transistor is electrically coupled to the second node.

During the implementation, the first control circuitry includes the third transistor, and the second control circuitry includes the fourth transistor. A type of the third transistor is different from that of the fourth transistor. When the third transistor is turned on, the fourth transistor is turned off, and when the fourth transistor is turned on, the third transistor is turned off.

In a possible embodiment of the present disclosure, the third transistor is a p-type transistor, and the fourth transistor is an n-type transistor; or the third transistor is an n-type transistor, and the fourth transistor is a p-type transistor.

In a possible embodiment of the present disclosure, the energy storage circuitry includes a storage capacitor, a first end of the storage capacitor is electrically coupled to the first node, and a second end of the storage capacitor is electrically coupled to a direct current voltage end.

During the implementation, the energy storage circuitry includes the storage capacitor configured to maintain the potential at the first node.

During the implementation, the direct current voltage end is, but not limited to, a common electrode voltage end. In actual use, the direct current voltage end may also be a low voltage end.

In at least one embodiment of the present disclosure, the driving circuitry includes a driving transistor, a gate electrode of the driving transistor is electrically coupled to the second node, a first electrode of the driving transistor is electrically coupled to the second voltage end, and a second electrode of the driving transistor is electrically coupled to the first electrode of the light-emitting element.

In a possible embodiment of the present disclosure, the driving transistor is a p-type transistor, and the first voltage end is a first high voltage end; or the driving transistor is an n-type transistor, and the first voltage end is a first low voltage end.

Figure 2:
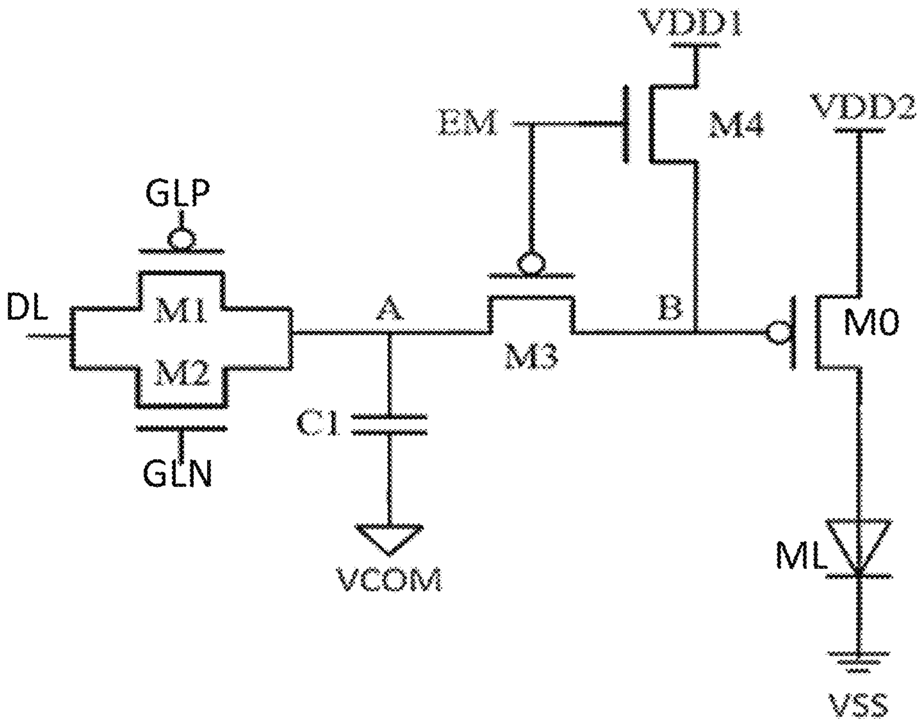
FIG. 2 is a circuit diagram of the pixel circuitry according to one embodiment of the present disclosure.

As shown in FIG. 2, based on the pixel circuitry in FIG. 1, the data write-in circuitry includes a first transistor M1 and a second transistor M2, and the write-in control end includes a first write-in control end GLP and a second write-in control end GLN.

A gate electrode of the first transistor M1 is electrically coupled to the first write-in control end GLP, a source electrode of the first transistor M1 is electrically coupled to the data line DL, and a drain electrode of the first transistor M1 is electrically coupled to the first node A.

A gate electrode of the second transistor M2 is electrically coupled to the second write-in control end GLN, a source electrode of the second transistor M2 is electrically coupled to the data line DL, and a drain electrode of the second transistor M2 is electrically coupled to the first node A.

The first control circuitry includes a third transistor M3, and the second control circuitry includes a fourth transistor M4.

A gate electrode of the third transistor M3 is electrically coupled to a light-emission control end EM, a source electrode of the third transistor M3 is electrically coupled to the first node A, and a drain electrode of the third transistor M3 is electrically coupled to the second node B.

A gate electrode of the fourth transistor M4 is electrically coupled to the light-emission control end EM, a source electrode of the fourth transistor M4 is electrically coupled to a first high voltage end VDD1, and a drain electrode of the fourth transistor M4 is electrically coupled to the second node B.

The driving circuitry includes a driving transistor M0, and the light-emitting element is a silicon-based Micro LED ML.

A gate electrode of the driving transistor M0 is electrically coupled to the second node B, a source electrode of the driving transistor M0 is electrically coupled to a second high voltage end VDD2, and a drain electrode of the driving transistor M0 is electrically coupled to an anode of the silicon-based Micro LED ML.

The energy storage circuitry includes a storage capacitor C1. A first end of the storage capacitor C1 is electrically coupled to the first node A, and a second end of the storage capacitor C1 is electrically coupled to a common electrode voltage end VCOM. A cathode of the silicon-based Micro LED ML is electrically coupled to a low voltage end VSS.

In the pixel circuitry in FIG. 2, M1 is a p-type transistor, M2 is an n-type transistor, M3 is a p-type transistor, M4 is an n-type transistor, and M0 is a p-type transistor.

During the operation of the pixel circuitry in FIG. 2, the display cycle includes N display time periods, where N is an integer greater than 1 and n is a positive integer less than or equal to N. An $n^{th}$ display time period includes an $n^{th}$ write-in stage and an $n^{th}$ light-emitting stage.

At the $n^{th}$ write-in stage, GLP provides a low voltage signal, and GLN provides a high voltage signal. M1 and M2 are turned on, so that an $n^{th}$ data voltage Vdn from the data line DL is written into C1. EM provides a high voltage signal, so M3 is turned off and M4 is turned on, so as to control VDD1 to be electrically coupled to B and turn off M0.

At the $n^{th}$ light-emitting stage, GLP provides a high voltage signal, and GLN provides a low voltage signal, so M1 and M2 are turned on. EM provides a low voltage signal, so M3 is turned on, M4 is turned off, and A is electrically coupled to B to write Vdn into the second node B.

When Vdn is a low voltage signal, M0 is turned on, so as to drive ML to emit light. When Vdn is a high voltage signal, M0 is turned off, and ML does not emit light.

During the operation of the pixel circuitry in FIG. 2, a difference between a voltage value of the first high voltage signal from VDD1 and a voltage value of the second high voltage signal from VDD2 is greater than a threshold voltage of M0, so that M0 is turned off when VDD1 is electrically coupled to B.

In the pixel circuitry in FIG. 2, the voltage value of the first high voltage signal from VDD1 is greater than or equal to 2 V and less than or equal to 8 V, the voltage value of the second high voltage signal from VDD2 is greater than or equal to 2 V and less than or equal to 8 V, the voltage value of the low voltage signal from VSS is greater than or equal to −5 V and less than or equal to 0 V, and the voltage value of Vdn is greater than or equal to 0 V and less than or equal to 8 V. However, the present disclosure is not limited thereto.

Figure 3:
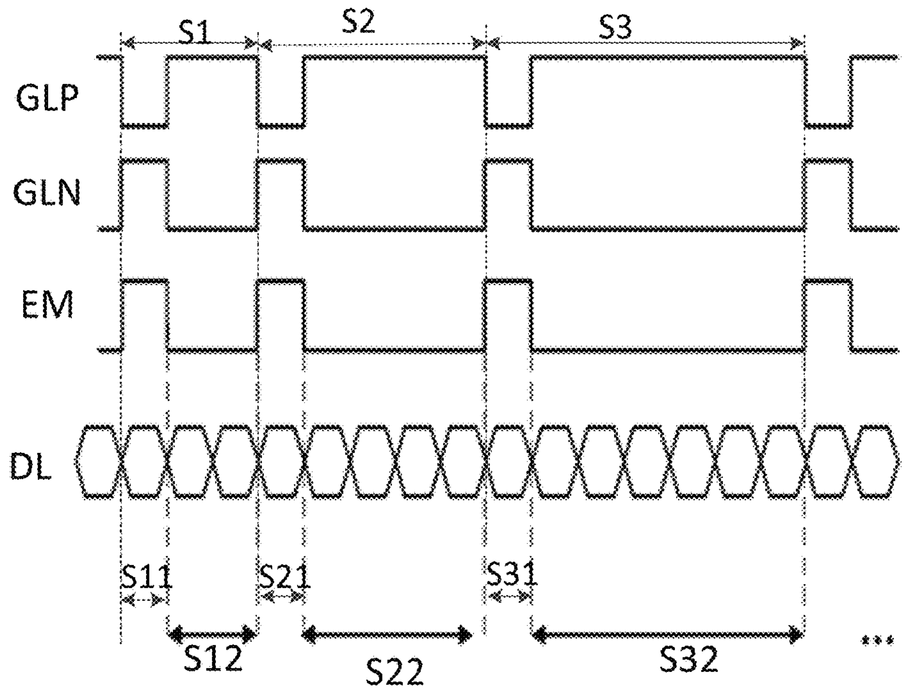
FIG. 3 is a sequence diagram of the pixel circuitry in FIG. 2.

As shown in FIG. 3, during the operation of the pixel circuitry in FIG. 2, when N is equal to 3, the display cycle includes a first display time period S1, a second display time period S2 and a third display time period S3 arranged one after another.

The first display time period S1 includes a first write-in stage S11 and a first light-emitting stage S12, the second display time period S2 includes a second write-in stage S21 and a second light-emitting stage S22, and the third display time period S3 includes a third write-in stage S31 and a third light-emitting stage S32.

At the first write-in stage S11, GLP provides a low voltage signal, and GLN provides a high voltage signal, so M1 and M2 are turned on, and a first data voltage Vd1 from DL is written into C1. EM provides a high voltage signal, so M3 is turned off, and the M4 is turned on, so as to control VDD1 to be electrically coupled to B and turn off M0.

At the first light-emitting stage S12, GLP provides a high voltage signal, and GLN provides a low voltage signal, so M1 and M2 are turned off. EM provides a low voltage signal, so M3 is turned on, M4 is turned off, and A is electrically coupled to B to write Vd1 into the second node B. When Vd1 is a high voltage signal, M0 is turned off, and ML does not emit light. When Vd1 is a low voltage signal, M0 is turned on to drive ML to emit light.

At the second write-in stage S21, GLP provides a low voltage signal, and GLN provides a high voltage signal, so M1 and M2 are turned on, and a second data voltage Vd2 from DL is written into C1. EM provides a high voltage signal, so M3 is turned off, and MA is turned on, so as to control VDD1 to be electrically coupled to B and turned off M0.

At the second light-emitting stage S22, GLP provides a high voltage signal, and GLN provides a low voltage signal, so M1 and M2 are turned off. EM provides a low voltage signal, so M3 is turned on, M4 is turned off, and A is electrically coupled to B to write Vd2 into the second node B. When Vd2 is a high voltage signal, M0 is turned off, and ML does not emit light. When Vd2 is a low voltage signal, M0 is turned on to drive ML to emit light.

At the third write-in stage S31, GLP provides a low voltage signal, and GLN provides a high voltage signal, so M1 and M2 are turned on, and a third data voltage Vd3 from DL is written into the C1. EM provides a high voltage signal, so M3 is turned off, and M4 is turned on, so as to control VDD1 to be electrically coupled to B and turned off M0.

At the third light-emitting stage S32, GLP provides a high voltage signal, and GLN provides a low voltage signal, so M1 and M2 are turned off. EM provides a low voltage signal, so M3 is turned on, M4 is turned off, and A is electrically coupled to B to write Vd3 into the second node B. When Vd3 is a high voltage signal, M0 is turned off, and ML does not emit light. When Vd3 is a low voltage signal, M0 is conducted to drive ML to emit light.

Figure 4:
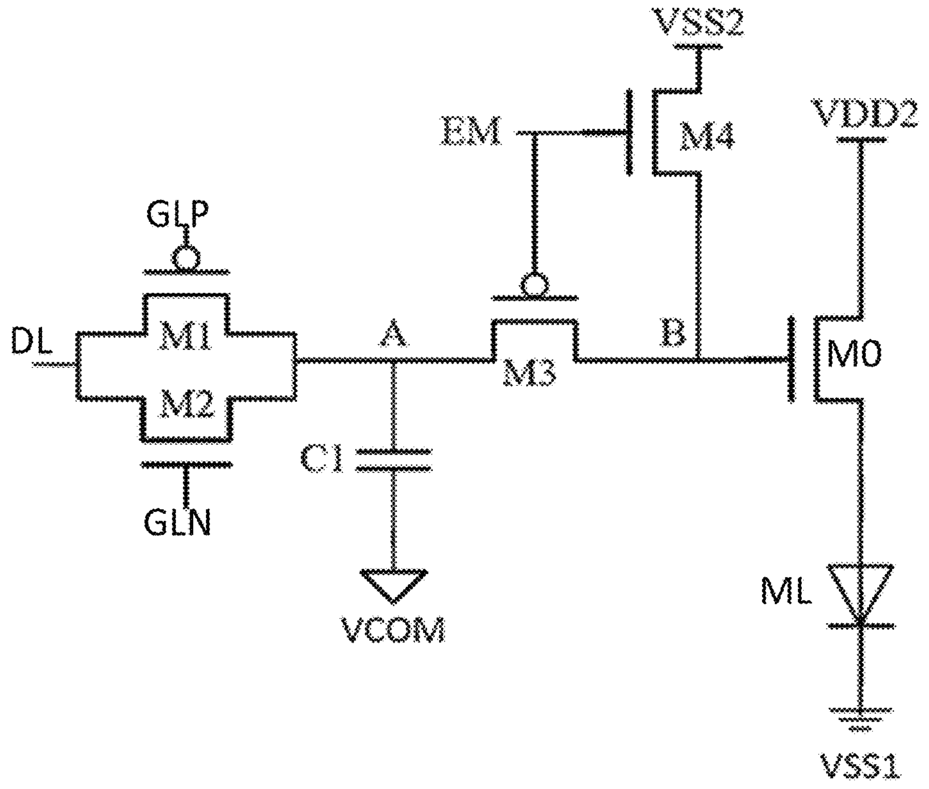
FIG. 4 is another circuit diagram of the pixel circuitry according to one embodiment of the present disclosure.

As shown in FIG. 4, based on the pixel circuitry in FIG. 1, the data write-in circuitry includes a first transistor M1 and a second transistor M2, and the write-in control end includes a first write-in control end GLP and a second write-in control end GLN.

A gate electrode of the first transistor M1 is electrically coupled to the first write-in control end GLP, a source electrode of the first transistor M1 is electrically coupled to the data line DL, and a drain electrode of the first transistor M1 is electrically coupled to the first node A.

A gate electrode of the second transistor M2 is electrically coupled to the second write-in control end GLN, a source electrode of the second transistor M2 is electrically coupled to the data line DL, and a drain electrode of the second transistor M2 is electrically coupled to the first node A.

The first control circuitry includes a third transistor M3, and the second control circuitry includes a fourth transistor M4.

A gate electrode of the third transistor M3 is electrically coupled to the light-emission control end EM, a source electrode of the third transistor M3 is electrically coupled to the first node A, and a drain electrode of the third transistor M3 is electrically coupled to the second node B.

A gate electrode of the fourth transistor M4 is electrically coupled to the light-emission control end EM, a source electrode of the fourth transistor M4 is electrically coupled to a second low voltage end VSS2, and a drain electrode of the fourth transistor M4 is electrically coupled to the second node B.

The driving circuitry includes a driving transistor M0, and the light-emitting element is a silicon-based Micro LED ML.

A gate electrode of the driving transistor M0 is electrically coupled to the second node B, a source electrode of the driving transistor M0 is electrically coupled to a second high voltage end VDD2, and a drain electrode of the driving transistor M0 is electrically coupled to the anode of the silicon-based Micro LED ML.

The energy storage circuitry includes a storage capacitor C1. A first end of the storage capacitor C1 is electrically coupled to the first node A, and a second end of the storage capacitor C1 is electrically coupled to a common electrode voltage end VCOM. A cathode of the silicon-based Micro LED ML is electrically coupled to a first low voltage end VSS1.

In the pixel circuitry in FIG. 4, M1 is a p-type transistor, M2 is an n-type transistor, M3 is a p-type transistor, M4 is an n-type transistor, and M0 is an n-type transistor.

During the operation of the pixel circuitry in FIG. 4, the display cycle includes N display time periods, where N is an integer greater than 1, and n is a positive integer less than or equal to N. An $n^{th}$ display time period includes an $n^{th}$ write-in stage and an $n^{th}$ light-emitting stage.

At the $n^{th}$ write-in stage, GLP provides a low voltage signal, and GLN provides a high voltage signal, so M1 and M2 are turned on, and an $n^{th}$ data voltage Vdn from DL is written into C1. EM provides a high voltage signal, so M3 is turned off, and M4 is turned on, so as to control VSS2 to be electrically coupled to B and turn off M0.

At the $n^{th}$ light-emitting stage, GLP provides a high voltage signal, and GLN provides a low voltage signal, so M1 and M2 are turned off. EM provides a low voltage signal, so M3 is turned on, M4 is turned off, and A is electrically coupled to B, so as to write Vdn into the second node B.

When Vdn is a high voltage signal, M0 is turned on to drive ML to emit light. When Vdn is a low voltage signal, M0 is turned off, and ML does not emit light.

During the operation of the pixel circuitry in FIG. 4, a difference between a voltage value of the second low voltage signal from VSS2 and a voltage value of the second high voltage signal from VDD2 is less than a threshold voltage of M0, so that M0 is turned off when VSS2 is electrically coupled to B.

In the pixel circuitry in FIG. 4, the voltage value of the second low voltage signal from VSS2 is greater than or equal to 0 V and less than or equal to 2 V, the voltage value of the second high voltage signal from VDD2 is greater than or equal to 2 V and less than or equal to 8 V, the voltage value of the first low voltage signal from VSS1 is greater than or equal to −5 V and less than or equal to 0 V, and the voltage value of Vdn is greater than or equal to 0 V and less than or equal to 8 V. However, the present disclosure is not limited thereto.

Figure 5:
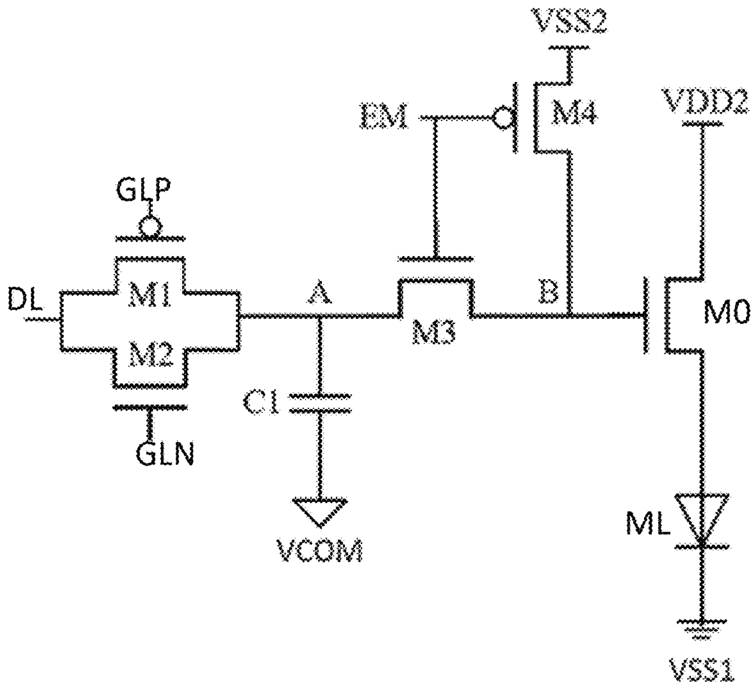
FIG. 5 is yet another circuit diagram of the pixel circuitry according to one embodiment of the present disclosure.

As shown in FIG. 5, based on the pixel circuitry in FIG. 1, the data write-in circuitry includes a first transistor M1 and a second transistor M2; the write-in control end includes a first write-in control end GLP and a second write-in control end GLN.

A gate electrode of the first transistor M1 is electrically coupled to the first write-in control end GLP, a source electrode of the first transistor M1 is electrically coupled to the data line DL, and a drain electrode of the first transistor M1 is electrically coupled to the first node A.

A gate electrode of the second transistor M2 is electrically coupled to the second write-in control end GLN, a source electrode of the second transistor M2 is electrically coupled to the data line DL, and a drain electrode of the second transistor M2 is electrically coupled to the first node A.

The first control circuitry includes a third transistor M3, and the second control circuitry includes a fourth transistor M4.

A gate electrode of the third transistor M3 is electrically coupled to the light-emission control end EM, a source electrode of the third transistor M3 is electrically coupled to the first node A, and a drain electrode of the third transistor M3 is electrically coupled to the second node B.

A gate electrode of the fourth transistor M4 is electrically coupled to the light-emission control end EM, a source electrode of the fourth transistor M4 is electrically coupled to a second low voltage end VSS2, and a drain electrode of the fourth transistor M4 is electrically coupled to the second node B.

The driving circuitry includes a driving transistor M0, and the light-emitting element is a silicon-based Micro LED ML.

A gate electrode of the driving transistor M0 is electrically coupled to the second node B, a source electrode of the driving transistor M0 is electrically coupled to a second high voltage end VDD2, and a drain electrode of the driving transistor M0 is electrically coupled to an anode of the silicon-based Micro LED ML.

The energy storage circuitry includes a storage capacitor C1. A first end of the storage capacitor C1 is electrically coupled to the first node A, and a second end of the storage capacitor C1 is electrically coupled to a common electrode voltage end VCOM. A cathode of the silicon-based Micro LED ML is electrically coupled to a first low voltage end VSS1.

In the pixel circuitry in FIG. 5, M1 is a p-type transistor, M2 is an n-type transistor, M3 is an n-type transistor, M4 is a p-type transistor, and M0 is an n-type transistor.

During the operation of the pixel circuitry in FIG. 5, the display cycle includes N display time periods, where N is an integer greater than 1 and n is a positive integer less than or equal to N. An $n^{th}$ display time period includes an $n^{th}$ write-in stage and an $n^{th}$ light-emitting stage.

At the nah write-in stage, GLP provides a low voltage signal, and GLN provides a high voltage signal, so M1 and M2 are turned on and an $n^{th}$ data voltage Vdn from DL is written into C1. EM provides a low voltage signal, so M3 is turned off, and M4 is turned on, so as to control VSS2 to be electrically coupled to B and turn off M0.

At the $n^{th}$ light-emitting stage, GLP provides a high voltage signal, and GLN provides a low voltage signal, so M1 and M2 are turned off. EM provides a high voltage signal, so M3 is turned on, M4 is turned off, and A is electrically coupled to B, so as to write Vdn into the second node B.

When Vdn is a high voltage signal, M0 is turned on to drive ML to emit light. When Vdn is a low voltage signal, M0 is turned off, and ML does not emit light.

During the operation of the pixel circuitry in FIG. 5, a difference between a voltage value of the second low voltage signal from VSS2 and a voltage value of the second high voltage signal from VDD2 is less than a threshold voltage of M0, so that M0 is turned off when VSS2 is electrically coupled to B.

In the pixel circuitry in FIG. 5, the voltage value of the second low voltage signal from VSS2 is greater than or equal to 0 V and less than or equal to 2 V, the voltage value of the second high voltage signal from VDD2 is greater than or equal to 0 V and less than or equal to 8 V, the voltage value of the first low voltage signal from VSS1 is greater than or equal to −5 V and less than or equal to 0 V, and the voltage value of Vdn is greater than or equal to 0 V and less than or equal to 8 V. However, the present disclosure is not limited thereto.

Figure 6:
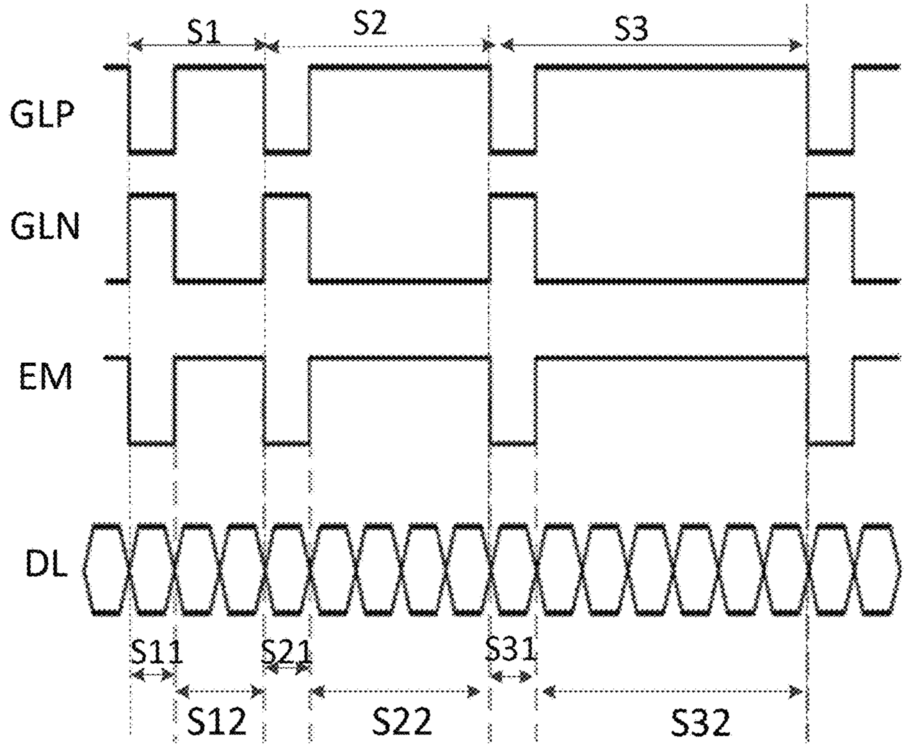
FIG. 6 is a sequence diagram of the pixel circuitry in FIG. 5.

As shown in FIG. 6, during the operation of the pixel circuitry in FIG. 5, when N is equal to 3, the display cycle includes a first display time period S1, a second display time period S2, and a third display time period S3 arranged one after another.

The first display time period S1 includes a first write-in stage S11 and a first light-emitting stage S12, the second display time period S2 includes a second write-in stage S21 and a second light-emitting stage S22, and the third display time period S3 includes a third write-in stage S31 and a third light-emitting stage S32.

At the first write-in stage S11, GLP provides a low voltage signal, and GLN provides a high voltage signal, so M1 and M2 are turned on, and a first data voltage Vd1 from DL is written into C1. EM provides a low voltage signal, so M3 is turned off, and M4 is turned on, so as to control VSS2 to be electrically coupled to B and turn off M0.

At the first light-emitting stage S12, GLP provides a high voltage signal, and GLN provides a low voltage signal, so M1 and M2 are turned off. EM provides a high voltage signal, so M3 is turned on, M4 is turned off, and A is electrically coupled to B to write Vd1 into the second node B. When Vd1 is a low voltage signal, M0 is turned off, and ML does not emit light. When Vd1 is a high voltage signal, M0 is turned on to drive ML to emit light.

At the second write-in stage S21, GLP provides a low voltage signal, and GLN provides a high voltage signal, so M1 and M2 are turned on, and a second data voltage Vd2 from DL is written into C1. EM provides a low voltage signal, so M3 is turned off, and M4 is turned on, so as to control VDD1 to be electrically coupled to B and turn off M0.

At the second light-emitting stage S22, GLP provides a high voltage signal, and GLN provides a low voltage signal, so M1 and M2 are turned off. EM provides a high voltage signal, so M3 is turned on, M4 is turned off, and A is electrically coupled to B to write Vd2 into the second node B. When Vd2 is a low voltage signal, M0 is turned off, and ML does not emit light. When Vd2 is a high voltage signal, M0 is turned on to drive ML to emit light.

At the third write-in stage S31, GLP provides a low voltage signal, and GLN provides a high voltage signal, so M1 and M2 are turned on, and a third data voltage Vd3 from DL is written into C1. EM provides a low voltage signal, so M3 is turned off, and M4 is turned on, so as to control VDD1 to be electrically coupled to B and turn off M0.

At the third light-emitting stage S32, GLP provides a high voltage signal, and GLN provides a low voltage signal, so M1 and M2 are turned off. EM provides a high voltage signal, so M3 is turned on, M4 is turned off, and A is electrically coupled to B to write Vd3 into the second node B. When Vd3 is a low voltage signal, M0 is turned off, and ML does not emit light. When Vd3 is a high voltage signal, M0 is turned on to drive ML to emit light.

The present disclosure further provides in some embodiments a driving method for the above-mentioned pixel circuitry. A display cycle includes N display time periods, and an $n^{th}$ display time period includes an $n^{th}$ write-in stage and an $n^{th}$ light-emitting stage arranged one after another, where N is an integer greater than 1, and n is a positive integer less than or equal to N. The driving method includes: at the $n^{th}$ write-in stage, writing, by a data write-in circuitry, an $n^{th}$ data voltage from a data line into a first node under the control of a write-in control signal, maintaining, by an energy storage circuitry, a potential at the first node, and controlling, by a second control circuitry, a first voltage end to be electrically coupled to a second node under the control of a light-emission control signal, so as to enable a driving circuitry to be turned off under the control of a potential at the second node; and at the $n^{th}$ light-emitting stage, controlling, by a first control circuitry, the first node to be electrically coupled to the second node under the control of the light-emission control signal to write the $n^{th}$ data voltage into the second node, and controlling, by the driving circuitry, whether to drive a light-emitting element to emit light in accordance with the $n^{th}$ data voltage.

In at least one embodiment of the present disclosure, durations of N light-emitting stages are different from each other.

In at least one embodiment of the present disclosure, durations of at least a part of the N light-emitting stages are different from each other.

In a possible embodiment of the present disclosure, duration of the $n^{th}$ light-emitting stage is 2n*t0 or $2^n$*t0, where t0 is a reference light-emitting time.

The present disclosure further provides in some embodiments a display substrate, which includes a silicon substrate, and the above-mentioned pixel circuitry arranged on the silicon substrate.

The present disclosure further provides in some embodiments a display device which includes the above-mentioned display substrate.

The above embodiments are for illustrative purposes only, but the present disclosure is not limited thereto. Obviously, a person skilled in the art may make further modifications and improvements without departing from the spirit of the present disclosure, and these modifications and improvements shall also fall within the scope of the present disclosure.

What is claimed is:

1. A pixel circuitry, comprising a data write-in circuitry, an energy storage circuitry, a first control circuitry, a second control circuitry, a driving circuitry, and a light-emitting element, wherein the data write-in circuitry is electrically coupled to a write-in control end, a data line and a first node, and configured to write a data voltage from the data line into the first node under the control of a write-in control signal from the write-in control end;

the energy storage circuitry is electrically coupled to the first node, and configured to maintain a potential at the first node;

the first control circuitry is electrically coupled to a light-emission control end, the first node and a second node, and configured to control the first node to be electrically coupled to, or electrically decoupled from, the second node under the control of a light-emission control signal from the light-emission control end;

the second control circuitry is electrically coupled to the light-emission control end, a first voltage end and the second node, and configured to control the first voltage end to be electrically coupled to, or electrically decoupled from, the second node under the control of the light-emission control signal;

the driving circuitry is electrically coupled to the second node, a second voltage end, and a first electrode of the light-emitting element, and configured to generate a driving current flowing from the second voltage end to the first electrode of the light-emitting element under the control of a potential at the second node; and a second electrode of the light-emitting element is electrically coupled to a third voltage end.

2. The pixel circuitry according to claim 1, wherein the data write-in circuitry comprises a first transistor and a second transistor, and the write-in control end comprises a first write-in control end and a second write-in control end;

a gate electrode of the first transistor is electrically coupled to the first write-in control end, a first electrode of the first transistor is electrically coupled to the data line, and a second electrode of the first transistor is electrically coupled to the first node; and a gate electrode of the second transistor is electrically coupled to the second write-in control end, a first electrode of the second transistor is electrically coupled to the data line, and a second electrode of the second transistor is electrically coupled to the first node.

3. The pixel circuitry according to claim 2, wherein the first transistor is a p-type transistor, and the second transistor is an n-type transistor; or the first transistor is an n-type transistor, and the second transistor is a p-type transistor.

4. The pixel circuitry according to claim 3, wherein the driving circuitry comprises a driving transistor, a gate electrode of the driving transistor is electrically coupled to the second node, a first electrode of the driving transistor is electrically coupled to the second voltage end, and a second electrode of the driving transistor is electrically coupled to the first electrode of the light-emitting element.

5. The pixel circuitry according to claim 2, wherein the driving circuitry comprises a driving transistor, a gate electrode of the driving transistor is electrically coupled to the second node, a first electrode of the driving transistor is electrically coupled to the second voltage end, and a second electrode of the driving transistor is electrically coupled to the first electrode of the light-emitting element.

6. The pixel circuitry according to claim 1, wherein the first control circuitry comprises a third transistor, and the second control circuitry comprises a fourth transistor;

a gate electrode of the third transistor is electrically coupled to the light-emission control end, a first electrode of the third transistor is electrically coupled to the first node, and a second electrode of the third transistor is electrically coupled to the second node; and a gate electrode of the fourth transistor is electrically coupled to the light-emission control end, a first electrode of the fourth transistor is electrically coupled to the first voltage end, and a second electrode of the fourth transistor is electrically coupled to the second node.

7. The pixel circuitry according to claim 6, wherein the third transistor is a p-type transistor, and the fourth transistor is an n-type transistor; or the third transistor is an n-type transistor, and the fourth transistor is a p-type transistor.

8. The pixel circuitry according to claim 7, wherein the driving circuitry comprises a driving transistor, a gate electrode of the driving transistor is electrically coupled to the second node, a first electrode of the driving transistor is electrically coupled to the second voltage end, and a second electrode of the driving transistor is electrically coupled to the first electrode of the light-emitting element.

9. The pixel circuitry according to claim 6, wherein the driving circuitry comprises a driving transistor, a gate electrode of the driving transistor is electrically coupled to the second node, a first electrode of the driving transistor is electrically coupled to the second voltage end, and a second electrode of the driving transistor is electrically coupled to the first electrode of the light-emitting element.

10. The pixel circuitry according to claim 1, wherein the energy storage circuitry comprises a storage capacitor, a first end of the storage capacitor is electrically coupled to the first node, and a second end of the storage capacitor is electrically coupled to a direct current voltage end.

11. The pixel circuitry according to claim 10, wherein the driving circuitry comprises a driving transistor, a gate electrode of the driving transistor is electrically coupled to the second node, a first electrode of the driving transistor is electrically coupled to the second voltage end, and a second electrode of the driving transistor is electrically coupled to the first electrode of the light-emitting element.

12. The pixel circuitry according to claim 1, wherein the driving circuitry comprises a driving transistor, a gate electrode of the driving transistor is electrically coupled to the second node, a first electrode of the driving transistor is electrically coupled to the second voltage end, and a second electrode of the driving transistor is electrically coupled to the first electrode of the light-emitting element.

13. The pixel circuitry according to claim 12, wherein the driving transistor is a p-type transistor, and the first voltage end is a first high voltage end; or the driving transistor is an n-type transistor, and the first voltage end is a first low voltage end.

14. The pixel circuitry according to claim 1, wherein the light-emitting element is a silicon-based micro Light-Emitting Diode (Micro LED), and the pixel circuitry is arranged on a silicon substrate.

15. A driving method for the pixel circuitry according to claim 1, wherein a display cycle comprises N display time periods, an $n^{th}$ display time period comprises an $n^{th}$ write-in stage and an $n^{th}$ light-emitting stage arranged one after another, where N is an integer greater than 1, and n is a positive integer less than or equal to N, wherein the driving method comprises:

at the $n^{th}$ write-in stage, writing, by a data write-in circuitry, an $n^{th}$ data voltage from a data line into a first node under the control of a write-in control signal, maintaining, by an energy storage circuitry, a potential at the first node, and controlling, by a second control circuitry, a first voltage end to be electrically coupled to a second node under the control of a light-emission control signal, so as to enable a driving circuitry to be turned off under the control of a potential at the second node; and at the $n^{th}$ light-emitting stage, controlling, by a first control circuitry, the first node to be electrically coupled to the second node under the control of the light-emission control signal to write the $n^{th}$ data voltage into the second node, and controlling, by the driving circuitry, whether to drive a light-emitting element to emit light in accordance with the $n^{th}$ data voltage.

16. The driving method according to claim 15, wherein durations of N light-emitting stages are different from each other.

17. The driving method according to claim 15, wherein durations of at least a part of the N light-emitting stages are different from each other.

18. The driving method according to claim 15, wherein a duration of the $n^{th}$ light-emitting stage is 2n*t0 or $2^n$*t0, where to is a reference light-emitting time.

19. A display substrate, comprising a silicon substrate, and the pixel circuitry according to claim 1 arranged on the silicon substrate.

20. A display device, comprising the display substrate according to claim 19.

* * * * *